US010235630B1

(12) United States Patent
Wu

(10) Patent No.: US 10,235,630 B1
(45) Date of Patent: Mar. 19, 2019

(54) MODEL RANKING INDEX

(71) Applicant: Wells Fargo Bank, N.A., San Francisco, CA (US)

(72) Inventor: Dane Wenzhen Wu, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 645 days.

(21) Appl. No.: 14/812,309

(22) Filed: Jul. 29, 2015

(51) Int. Cl.
*G06F 17/10* (2006.01)
*G06N 7/00* (2006.01)
*G06Q 30/02* (2012.01)
*G06Q 30/00* (2012.01)

(52) U.S. Cl.
CPC ............. *G06N 7/005* (2013.01); *G06Q 30/00* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 6,654,726 B1* | 11/2003 | Hanzek | ................. | G06Q 10/08 705/26.5 |
| 7,971,180 B2 | 6/2011 | Kreamer et al. | | |
| 8,370,239 B2 | 2/2013 | Graboske et al. | | |
| 9,117,227 B1* | 8/2015 | Agrawal | ............ | G06Q 30/0242 |
| 9,361,322 B1* | 6/2016 | Dutta | ..................... | G06Q 30/08 |
| 2003/0126006 A1* | 7/2003 | Kumar | ................... | G06Q 30/02 705/35 |
| 2003/0187713 A1* | 10/2003 | Hood | ..................... | G06Q 10/04 705/7.33 |
| 2006/0014129 A1* | 1/2006 | Coleman | .................. | G09B 7/02 434/322 |
| 2009/0112699 A1* | 4/2009 | Rinker | ................... | G06Q 10/10 705/329 |
| 2009/0132347 A1* | 5/2009 | Anderson | ............. | G06Q 30/02 705/14.52 |
| 2012/0022939 A1* | 1/2012 | Tiwari | .................. | G06Q 30/02 705/14.43 |
| 2012/0330714 A1* | 12/2012 | Malaviya | ............... | G06Q 30/02 705/7.29 |
| 2014/0039300 A1* | 2/2014 | Gjesdal | .................. | A61B 5/055 600/420 |

(Continued)

*Primary Examiner* — Aniss Chad
*Assistant Examiner* — Cuong V Luu
(74) *Attorney, Agent, or Firm* — Merchant & Gould P.C.

(57) ABSTRACT

An electronic computing device includes a processing unit and system memory. The system memory includes instructions which, when executed by the processing unit, cause the electronic computing device to obtain first data from a response rate by decile model. The first data includes response rates for responses received from one or more individuals or organizations in response to communications sent to the one or individuals or organizations. The first data is organized into deciles. Second data is obtained from the response rate by decile model. The second data includes a weighting percentage for each of the deciles. The first data and the second data are used to calculate a performance score for the response rate by decile model. The performance score provides an indication as to how well the response rate data is aligned by decile in the response rate by decile model.

18 Claims, 14 Drawing Sheets

(56) References Cited

U.S. PATENT DOCUMENTS

| | | | |
|---|---|---|---|
| 2014/0122245 A1* | 5/2014 | Qu | G06Q 30/0269 705/14.66 |
| 2014/0162241 A1* | 6/2014 | Morgia | G06Q 30/02 434/362 |
| 2014/0244658 A1* | 8/2014 | Mahmud | G06F 17/30283 707/748 |
| 2015/0242547 A1* | 8/2015 | Phadke | G06F 17/5009 703/2 |
| 2017/0154268 A1* | 6/2017 | Goldin | G06N 5/04 |

* cited by examiner

| Decile | Model E RR | Model E Weight | Model F RR | Model F Weight |
|---|---|---|---|---|
| 1 | 1.00% | 9.0% | 0.95% | 8.4% |
| 2 | 1.30% | 15.4% | 1.30% | 14.8% |
| 3 | 0.95% | 3.0% | 1.00% | 12.4% |
| 4 | 0.85% | 11.3% | 0.85% | 10.8% |
| 5 | 0.90% | 10.0% | 0.80% | 9.6% |
| 6 | 0.80% | 10.0% | 0.90% | 9.9% |
| 7 | 0.70% | 10.0% | 0.70% | 10.4% |
| 8 | 0.63% | 10.3% | 0.63% | 11.3% |
| 9 | 0.25% | 8.6% | 0.20% | 9.5% |
| 10 | 0.60% | 12.5% | 0.40% | 2.9% |

FIG. 7

| Period | Decile | Observations | Response Rate | | |
|---|---|---|---|---|---|
| 7/1/2014 | 1 | 1970 | 2.74% | Template User Instruction | |
| 7/1/2014 | 2 | 4158 | 1.90% | Paste in the model parameters for Period, Decile, Observations, and Response Rate | |
| 7/1/2014 | 3 | 5386 | 1.36% | Decile must be from 1 to 10 with 1 = best | |
| 7/1/2014 | 4 | 5848 | 1.01% | Period must be in Excel Date format | |
| 7/1/2014 | 5 | 6570 | 1.02% | Observations and Response Rate must be in numeric | |
| 7/1/2014 | 6 | 7157 | 0.74% | Data must be continuous (e.g. no blank rows, append new month's inputs to the end) | |
| 7/1/2014 | 7 | 7061 | 0.61% | | |
| 7/1/2014 | 8 | 7126 | 0.36% | After all monthly model parameters are in, click on "Calculate MRI" button below | |
| 7/1/2014 | 9 | 6815 | 0.19% | | |
| 7/1/2014 | 10 | 5142 | 0.16% | | |
| 9/1/2014 | 1 | 2100 | 2.19% | | |
| 9/1/2014 | 2 | 3387 | 1.83% | 910 —— Calculate MRI | |
| 9/1/2014 | 3 | 4249 | 1.72% | | |
| 9/1/2014 | 4 | 4867 | 1.19% | | |
| | | | | | |
| 5/1/2015 | 1 | 8258 | 2.02% | | |
| 5/1/2015 | 2 | 11171 | 1.41% | | |
| 5/1/2015 | 3 | 13503 | 1.06% | | |
| 5/1/2015 | 4 | 14304 | 0.78% | | |
| 5/1/2015 | 5 | 13680 | 0.63% | | |
| 5/1/2015 | 6 | 13682 | 0.47% | | |
| 5/1/2015 | 7 | 13306 | 0.31% | | |
| 5/1/2015 | 8 | 14090 | 0.26% | | |
| 5/1/2015 | 9 | 17225 | 0.12% | | |
| 5/1/2015 | 10 | 20635 | 0.11% | | |

FIG. 9

MODEL RANKING INDEX

BACKGROUND

Models can be developed to predict results in a variety of areas such as probability distributions, income inequality, genetics, customer surveys and other areas. Methods can be developed to measure and predict performance of these models. Measurements of performance can be used to determine selection of competing models and to track model performance.

Developing models to predict results and developing measures to track performance of these models can be complex tasks. Many variables can be involved and assumptions made during the development of the models, and the performance measures may not always be accurate.

SUMMARY

Embodiments of the disclosure are directed to an electronic computing device comprising: a processing unit; and system memory, the system memory including instructions which, when executed by the processing unit, cause the electronic computing device to: obtain first data from a first response rate by decile model, the first data including response rates for responses received from one or more individuals or organizations in response to communications sent to the one or individuals or organizations, the first data being organized into deciles; obtain second data from the first response rate by decile model, the second data including a weighting percentage for each of the deciles; and use the first data and the second data to calculate a first performance score for the first response rate by decile model, the first performance score providing an indication as to how well the response rate data is aligned by decile in the first response rate by decile model.

In another aspect, a computer-readable data storage memory includes instructions that, when executed by a processing unit of an electronic computing device, cause the processing unit to: obtain first data from a response rate by decile model, the first data including response rates for responses received from one or more individuals or organizations in response to communications sent to the one or individuals or organizations, the first data being organized into deciles; obtain second data from the response rate by decile model, the second data including a weighting percentage for each of the deciles; and use the first data and the second data to calculate a performance score for the response rate by decile model, the first performance score providing an indication as to how well the response rate data is aligned by decile in the response rate by decile model.

In yet another aspect, an electronic computing device includes a processing unit; and system memory, the system memory including instructions which, when executed by the processing unit, cause the first electronic computing device to: obtain first data from a first response rate by decile model, the first data including response rates for responses received from one or more individuals or organizations in response to communications sent to the one or individuals or organizations, the first data being organized into deciles; obtain second data from the first response rate by decile model, the second data including a weighting percentage for each of the deciles; calculate differences in response rates between deciles; use the differences in response rates between the deciles to determine one or more misalignments in the response rates between deciles; calculate a numerical value proportional to a distance in deciles to which response rate data alignment deviations are separated; calculate a numerical value proportional to a magnitude of a difference in response rates for one of two adjacent deciles in which the one or more misalignments occur; calculate a breadth of misalignment score, the breadth of misalignment score being proportional to a sum of a natural logarithm for each of the differences of response rates; calculate a depth of misalignment score, the depth of misalignment score being proportional to a sum for each of the differences in response rates between deciles of a product of the weighting percentage for the one of the two adjacent deciles, the numerical value proportional to the magnitude of the difference in response rates for the one of two adjacent deciles in which the one or more misalignments occur and the numerical value proportional to the distance in deciles to which the response rate data alignment deviations are separated; and calculate a performance score for the response rate by decile model, the performance score being equal to one minus a sum of the breadth of misalignment score and the depth of misalignment score.

The details of one or more techniques are set forth in the accompanying drawings and the description below. Other features, objects, and advantages of these techniques will be apparent from the description, drawings, and claims.

DESCRIPTION OF THE DRAWINGS

FIG. 7 shows a table that lists example response rates and observation weights for two response rate by decile modules.

FIG. 9 shows a spreadsheet that shows example response rate data for a response rate by decile model.

DETAILED DESCRIPTION

Figure 1:
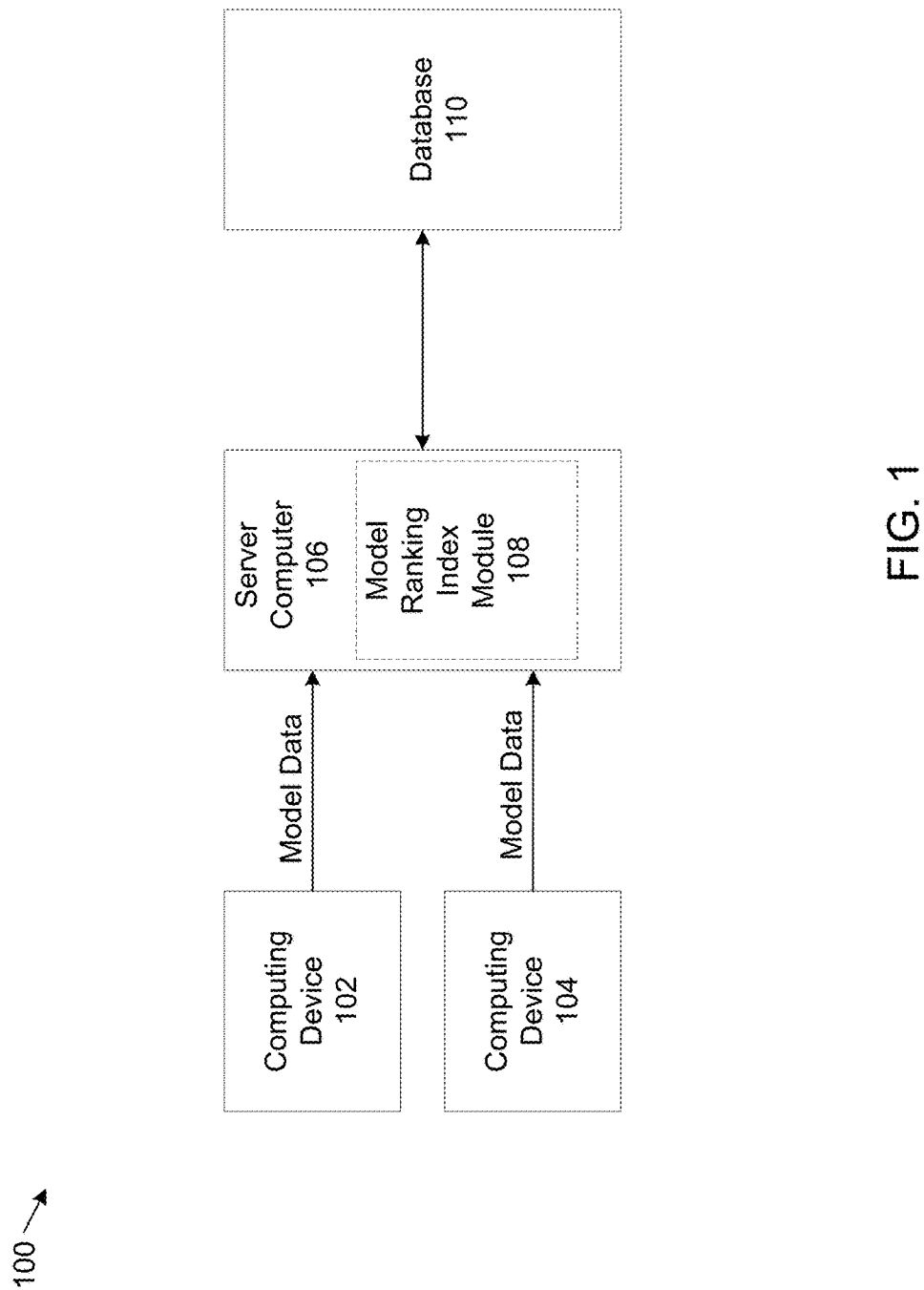
FIG. 1 shows an example system that supports model ranking index.

The present disclosure is directed to systems and methods for measuring performance of certain statistical models that can predict results. The systems and methods can calculate a score that indicates a degree to which responses obtained using the model are in alignment with the predicted results.

Scores can be calculated for a plurality of models and a determination can be made as to which model or models can be effective.

As an example, a statistical model can be used to predict a number of responses that are received from customers of a business as a result of a mailing or other communication that is sent to the customers. The communication can be a survey, a questionnaire or a similar type of item for which a response is requested from the customers. For example, customers can be sent marketing or sales information relating to one or more products of the business and can be asked to return a postcard or respond to an email if interested in any of the products. As another example, a survey can be sent to customers of an organization requesting feedback on a recent experience that the customer had at the organization. As a further example, a questionnaire can be sent to members of an organization requesting feedback as to types of services the members may be interested in.

The statistical model can organize the customers who are sent the communication into one of 10 groups, known as deciles. Each group in a decile can include an equal number of customers. For example, if a total of 10,000 mailings are sent to the customers, mailings can be sent to 1,000 customers for each decile. The model can be organized so that customers that are most likely to respond to the mailings can be grouped into decile 1, customers that are considered next most likely to respond can be grouped into decile 2 and customers that are considered least likely to respond can be grouped into decile 10. The organization can use customer history records and other information to provide input into the model that can group the customers based on how likely the customers are to respond to surveys or questionnaires.

When responses are received from the customers, a response rate can be calculated for each decile. When a highest percentage of responses is received in decile 1, a next highest percentage of responses is received in decile 2, a third highest percentage of responses is received in decile 3, etc., and a least highest percentage of responses is received in decile 10, the model is said to be in alignment. However, when one or more deciles have a response rate that is higher than a lower numbered decile (for example decile 3 having a higher response rate than decile 2), the model is said to be misaligned.

As stated above, each decile can include an equal number of customers so that an equal number of mailings can be sent to customers in each decile. However, during an actual operation of the model, some deciles can actually include more or less customers than other deciles. Some customers initially designated to receive mailings may not actually be sent mailings. This is, for example, because the organization sending out the mailings may wish to focus on certain customers at different times and for different types of mailings.

Sometimes misalignments can be misleading due to an uneven number of mailings sent out for each decile. For example, some lower deciles can have a greater response rate than a higher decile because a smaller number of mailings may be sent out for the lower deciles. When more responses are received for a smaller number of mailings, the corresponding higher response rate may be a result of the smaller number of mailings.

For at least this reason, the systems and methods monitor how many communications are actually sent out for each decile. A weighting percentage can be calculated for each decile. The weighting percentage for a decile can be equal to a number of communications sent out for the decile divided by a total number of communications sent out for all ten deciles. In this disclosure, the number of communications sent to a customer for which a response is requested can also be referred to as observations. The weighting percentage for the decile can also be referred to as the observation percentage for the decile.

Using the systems and methods, a performance score can be calculated for each model evaluated. A performance score can also be calculated for different time periods of a single model. The higher the performance score, the more the model is aligned to predicted results. As discussed in more detail later herein, the performance score is a function of a breadth of response rate rank misalignment and a depth of response rate rank misalignment. The breadth of response rate rank misalignment represents a distance in deciles to which response rate data alignment deviations are separated. The depth of response rate rank misalignment represents a difference in response rates for a combination of deciles multiplied by an observation weight percentage of one of the deciles in the combination of deciles multiplied by a measure of breadth of response rank misalignment.

The systems and methods disclosed herein can improve efficiencies of businesses who interface with customers. By validating the performance of certain statistical models, businesses can more effectively identify customers that are most likely to respond to mailings and other communications. By identifying such customers, businesses can direct communications to those customers most likely to respond, thereby improving computing efficiency in the business and reducing business cost. In addition, equations discussed herein to effectively test performance of statistical models are novel and not obvious to derive.

FIG. 1 shows an example system 100 in which a model ranking index methodology can be implemented. The example system 100 includes computing devices 102, 104, server computer 106 and database 110. Server computer 106 includes a model ranking index module 108.

The example computing devices 102, 104 are electronic computing devices on which response rate data can be entered. The response rate data can be entered by an employee of an organization who has access to this data. For example, the response rate data can be entered into a spreadsheet, such as an Excel spreadsheet. The response rate data reflects a percentage of responses received divided by queries sent out from the organization to users or customers for each of a plurality of deciles. The computing devices 102, 104 can be client computers, desktop computers, laptop computers, server computers or types of computing devices. More, less or different computer devices can be used.

The example server computer 106 is a server computer at an organization that can send surveys, questionnaires, marketing and sales material to customers. One example of such an organization is a financial institution. Other examples can include health care clinics, research organizations, government agencies, etc. Other examples of such organizations are possible. Server computer 106 can also receive the response rate data from computing devices 102, 104, store the response rate data and use the response rate data in the model ranking index module 108. For example, server computer 106 can receive one or more spreadsheets containing the response data from computing devices 102, 104.

The example database 110 can store response rate date and model score ranking data from computing devices 102, 104 and server computer 106. In some implementations the response rate data and the model score ranking data can be stored on server computer 106, on other server computers and other databases not shown in FIG. 1.

The example model ranking index module 108 can calculate a score representing a measure of an accuracy of a response rate model. As stated earlier herein and as discussed in more detail later herein, the score is a function of a breadth of model score misalignment and a depth of model score misalignment.

Figure 2:
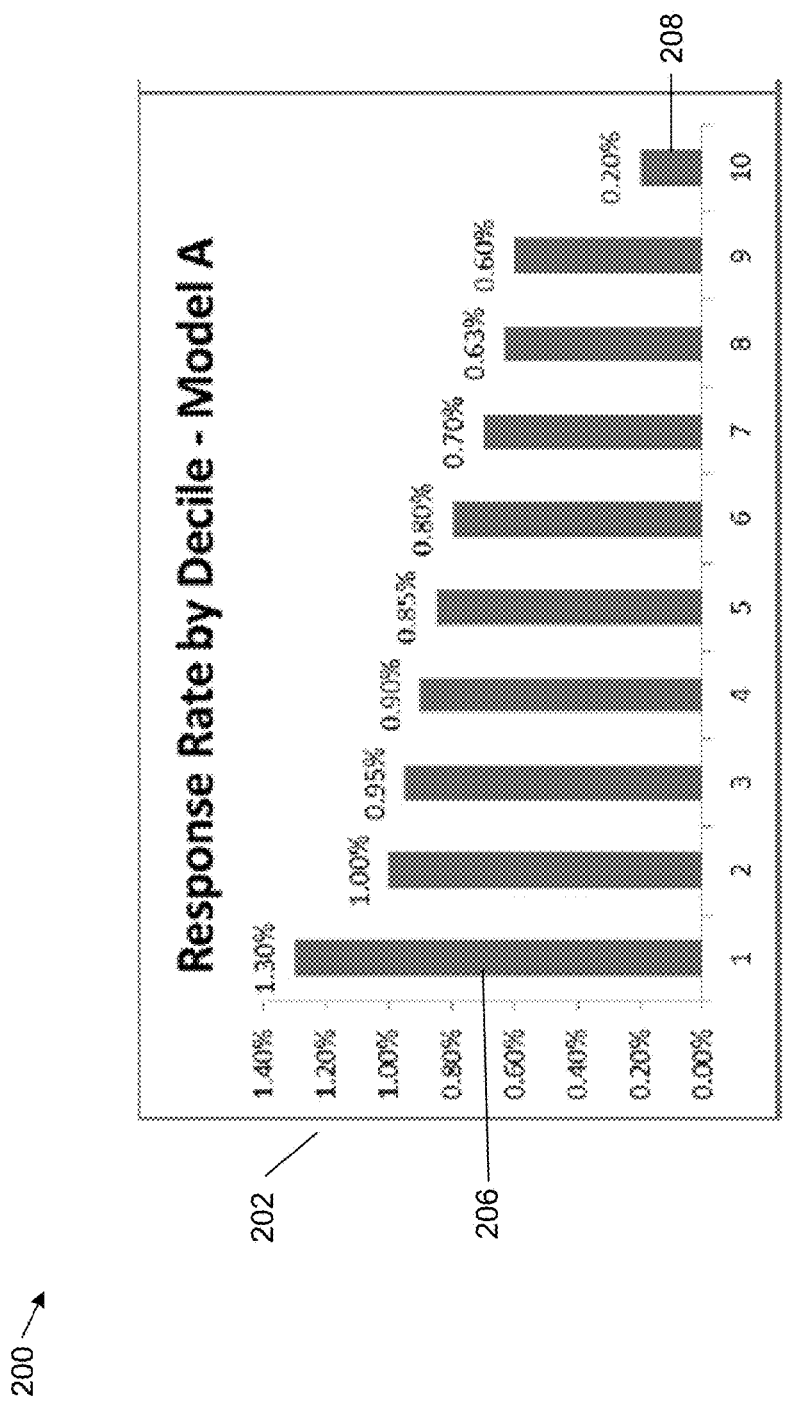
FIG. 2 shows an example bar graph that displays response rates for a response rate by decile model.

FIG. 2 shows an example bar graph 200 showing example response rates per decile for an example response rate model A. The bar graph 200 includes a vertical axis 202 and a horizontal axis 204. The vertical axis shows response rates in percentages, from a high percentage of 1.40% to a low percentage of 0.00%. The response rates represent rates of responses for surveys or questionnaires sent out to customers of an organization. For example, the response rates can represent rates of return for questionnaires or marketing surveys sent to customers of a financial institution such as a bank. The horizontal axis shows deciles for responses. The deciles range from a high decile of 1 to a low decile of 10. The deciles represent a portion of a total number of surveys or questionnaires sent out to the customers for the model. For the example response rate model A, an equal number of surveys or questionnaires are sent out to the customers for each decile.

The response rate model is designed so that customers that are most likely to respond are included in the highest decile (decile 1) and customers that are least likely to respond are included in the lowest decile (decile 10). When the model is in perfect alignment, the number of responses received in decile 1 should be higher than the number of responses received in decile 2. Similarly, the number of responses received in decile 2 should be higher than the number of responses received in decile 3, etc. As shown in FIG. 2, decile 1 has a response rate 206 of 1.30%, the highest response rate of the 10 deciles and decile 10 has a response rate 208 of 0.20%, the lowest response rate of the 10 deciles. In addition, each of deciles 2-9 has response rates that are higher than a next lower decile. As shown in FIG. 2, response rates for response rate model A are in perfect alignment. This indicates that response rate model A grouped customers into deciles to result in response rates that are in perfect alignment with response rate results predicted by response rate model A.

Figure 3:
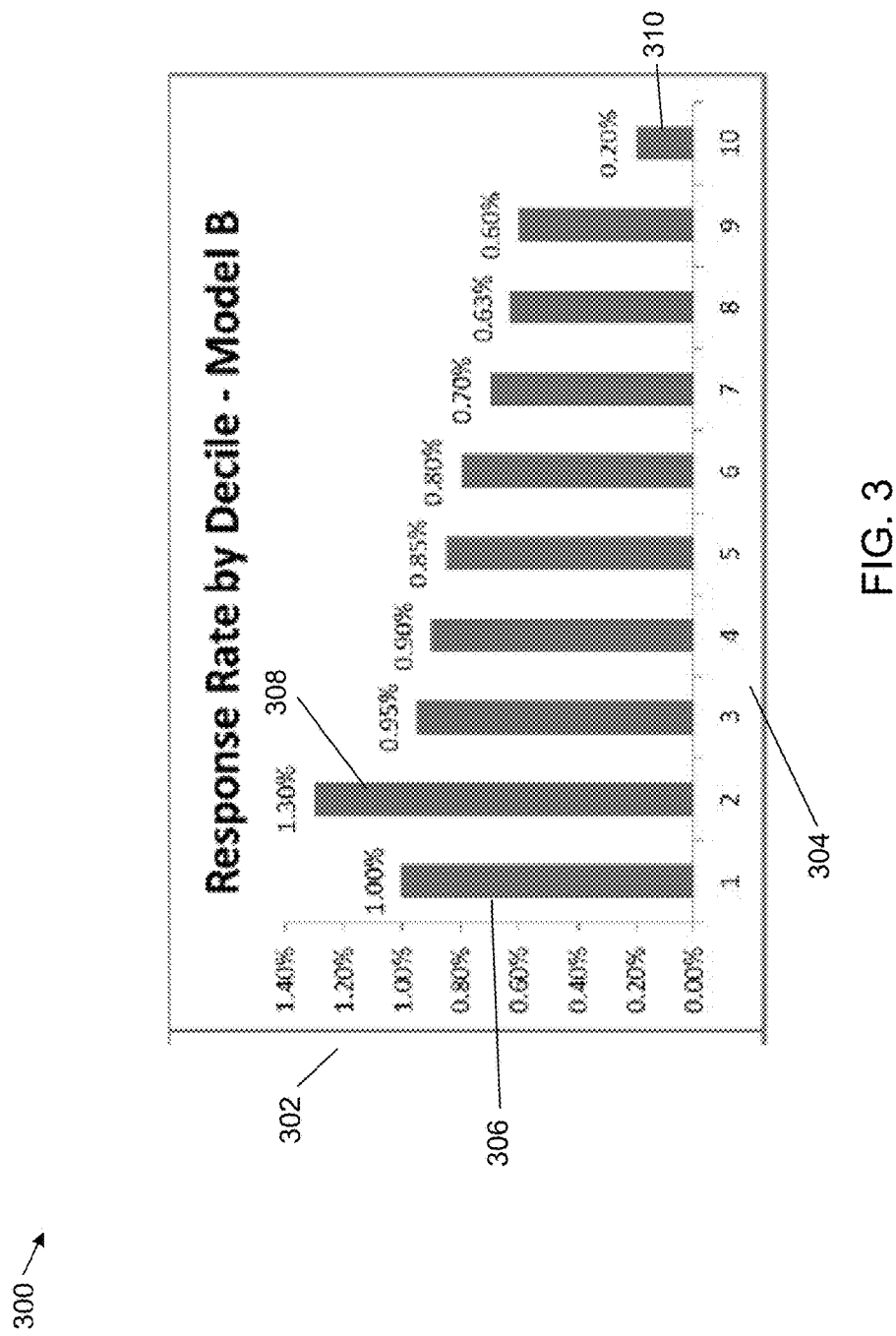
FIG. 3 shows another example bar graph that displays response rates for a response rate by decile model.

FIG. 3 shows an example bar graph 300 displaying response rates per decile for an example response rate model B. Bar graph 300 is similar to bar graph 200 of FIG. 2 in that a vertical axis 302 represents response rates to customer surveys or questionnaires ranging from a high of 1.40% to a low of 0.00%. The horizontal axis 304 also shows deciles ranging from decile 1 to decile 10. Response rate model B groups customers into deciles so that a highest number of responses are expected from customers in decile 1 and a lowest number of responses are expected from customers in decile 10. However, in contrast to response rate model A from FIG. 2, responses from response rate model B are not in perfect alignment.

As shown in FIG. 3, the response rate 306 in decile 1 of 1.00% is lower than response rate 308 in decile 2 of 1.3%. If responses from response rate model B were to be in perfect alignment, the response rate 308 in decile 2 should be lower than the response rate in decile 1. However, the response rates for deciles 3-10 are in alignment, with a response rate 310 of 0.20% in decile 10. As discussed in more detail later herein, a numerical alignment score can be calculated for each of response models A and B to provide a performance score for each model.

Figure 4:
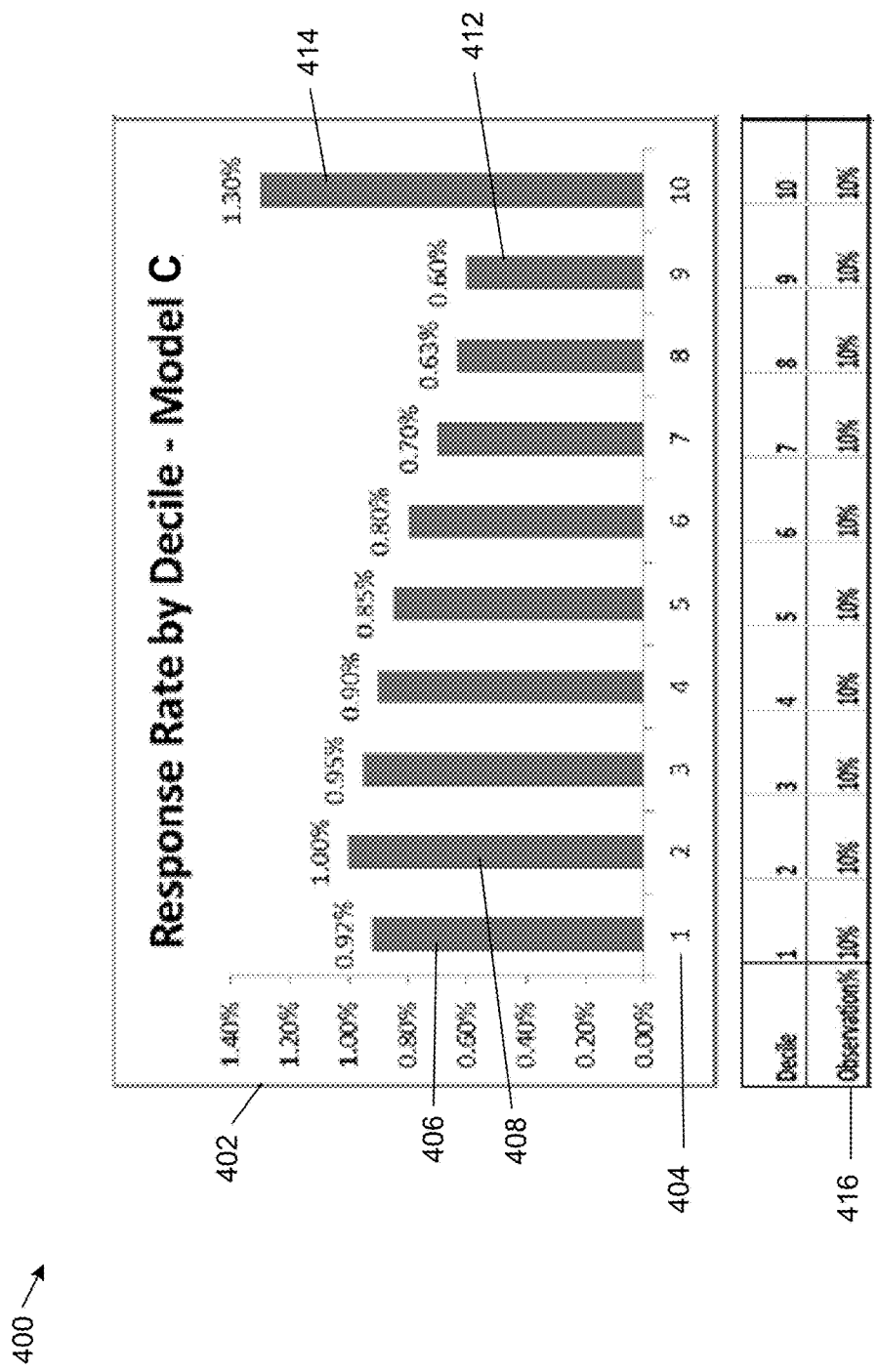
FIG. 4 shows yet another example bar graph that displays response rates for a response rate by decile model.

FIG. 4 shows an example bar graph 400 showing example response rates per decile for an example response rate model C. Bar graph 400 includes a vertical axis 402 that represents response rates to customer surveys or questionnaires ranging from a high of 1.40% to a low of 0.00%. Bar graph 400 also includes a horizontal axis 404 also that shows deciles ranging from decile 1 to decile 10.

Response rate model C also groups customers into deciles so that a highest number of responses are expected from customers in decile 1 and a lowest number of responses are expected from customers in decile 10. However, as shown in FIG. 4, response rate model 4 is not in perfect alignment because a response rate 408 from decile 2 at 1.00% is higher than a response rate 406 from decile 1 at 0.92%. In addition, an example response rate 414 from decile 10 at 1.30% which should be the lowest response rate of the 10 deciles is actually the highest response rate. Response rates from deciles 2-9 are in alignment, indicated by a response rate 408 of 1.00% from decile 2 to a successively lower response rate 412 of 0.60% from decile 9.

FIG. 4 also shows an observation rate 416 for each of the ten deciles. The observation rate 416 represents a weighting for each of the deciles. The weighting represents a percentage of a total of surveys or questionnaires sent out to customers for each decile. As shown in FIG. 4, the observation rate 416 for each of the deciles is 10%, indicating that each decile is weighted equally. An equal weighting for each decile indicates that response rate model C customers are grouped into deciles such that an equal number of surveys or questionnaires are sent out from each decile and an expectation is that a highest response rate is to be received from decile 1 and a successively lower response rate is to be received from deciles 2-10.

As shown in FIG. 4, response rate model C is not in perfect alignment, due to higher than expected responses in deciles 2 and 10. As discussed in more detail later herein, a numerical performance score can be calculated for response rate model C is quantify a degree to which response rate model C is out of alignment.

Figure 5:
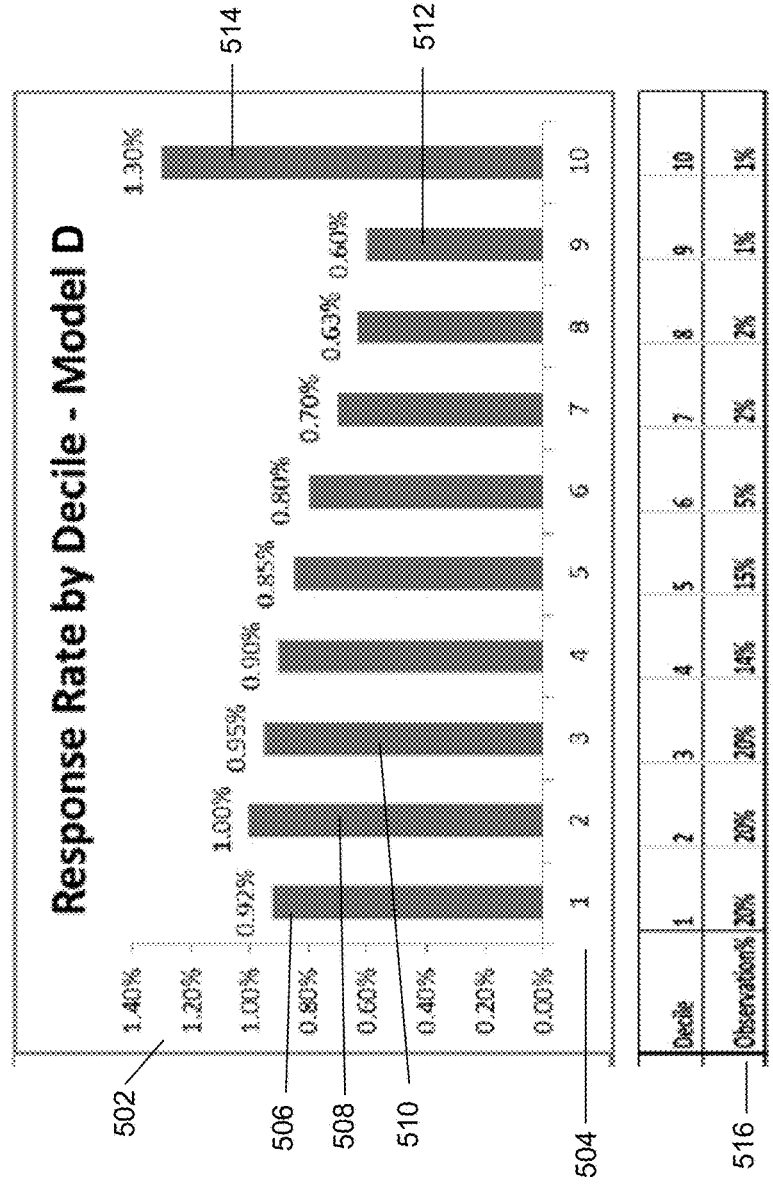
FIG. 5 shows yet another example bar graph that displays response rates for a response rate by decile model.

FIG. 5 shows an example bar graph 500 showing example response rates per decile for an example response rate model D. Bar graph 500 includes a vertical axis 502 that represents response rates to customer surveys or questionnaires ranging from a high of 1.40% to a low of 0.00%. Bar graph 500 also includes a horizontal axis 504 also that shows deciles ranging from decile 1 to decile 10. As shown in FIG. 5, example response rates for response rate model D are the same as for response rate model C from FIG. 4. However, with response rate model D, different observation rates are used for each of deciles 1-10, so even though the response rates are the same as for response rate model C, a performance score for response model D is different from a performance score for model C, as explained in more detail later herein.

As shown in FIG. 5, response rate model D is not in perfect alignment. A response rate 508 from decile 2 of 1.00% is greater than a response rate 506 from decile 1. In addition, a response rate 514 from decile 10 is greater than a response rate 512 from decile 9. However, as shown via observations 516, the observation rate for decile 10 is only 1%, so even though the example response rate for decile 10 is 1.30%, the response rate for decile 10 is based on a very small number of observations. As discuss later herein with respect to a formula for calculating a performance measure for the response rate models, a smaller observation rate for a decile has a smaller impact on a performance score for a response rate model than a higher observation rate would have.

Figure 6:
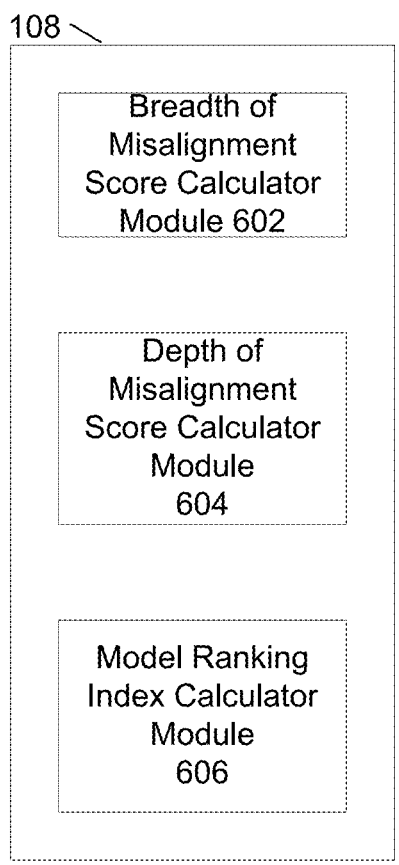
FIG. 6 shows example modules of the model ranking index module of FIG. 1.

FIG. 6 shows example modules of the model ranking index module 108 of FIG. 1. The example modules include a breadth of misalignment score calculator module 602, a depth of misalignment score calculator module 604 and a model ranking index calculator module 606. More, fewer or modules of the model ranking index module 108 are possible.

The example breadth of misalignment score calculator module 602 calculates a score that represents an extent to which there is a misalignment in a breadth of response rates for a response rate by decile model. As defined in this disclosure, a breadth of misalignment of response rates for the response rate by decile model represents a distance in deciles to which response rate data alignment deviations are separated.

In an example implementation, the breadth of misalignment of response rates can be represented by the following equation 1:

$$B(r) = \frac{\sum_{i<j}^{10} \ln(r_j - r_i)}{45}$$

where, B(r) is the breadth of misalignment of response rates r,
$r_j$ is a measured response rate for the jth decile,
$r_i$ is a measured response rate for the ith decile,
i and j are decile indexes,
i ranges from 1 to 9 and
j ranges from 2 to 10.

The numerator of equation 1 calculates a sum of natural logarithms for all combinations of decile response rates $r_j$-$r_i$ for which i is less than j. There are 45 such combinations for which i is less than j, including $r_2$-$r_1$, $r_3$-$r_1$, $r_4$-$r_1$, $r_5$-$r_1$, $r_6$-$r_1$, $r_7$-$r_1$, $r_8$-$r_1$, $r_9$-$r_1$, $r_{10}$-$r_1$, $r_3$-$r_2$, $r_4$-$r_2$, $r_5$-$r_2$, $r_6$-$r_2$, $r_7$-$r_2$, $r_8$-$r_2$, $r_9$-$r_2$, $r_{10}$-$r_2$, $r_4$-$r_3$, $r_5$-$r_3$, $r_6$-$r_3$, $r_7$-$r_3$, $r_8$-$r_3$, $r_9$-$r_3$, $r_{10}$-$r_3$, $r_5$-$r_4$, $r_6$-$r_4$, $r_7$-$r_4$, $r_8$-$r_4$, $r_9$-$r_4$, $r_{10}$-$r_4$, $r_6$-$r_5$, $r_7$-$r_5$, $r_8$-$r_5$, $r_9$-$r_5$, $r_{10}$-$r_5$, $r_7$-$r_6$, $r_8$-$r_6$, $r_9$-$r_6$, $r_{10}$-$r_6$, $r_8$-$r_7$, $r_9$-$r_7$, $r_{10}$-$r_7$, $r_9$-$r_8$, $r_{10}$-$r_8$ and $r_{10}$-$r_9$.

When a misalignment occurs, $r_j$-$r_i$ is a positive number because a response rate for a higher numbered decile is greater than a response rate for a lower numbered decile. In addition, the greater a separation between response rates that are misaligned, the more terms $r_j$-$r_i$ that will be positive. For example, if there were a misalignment between the first decile and the 10$^{th}$ decile, there will be positive values for all $r_j$-$r_i$ terms between decile 1 and 10 including $r_{10}$-$r_1$, $r_{10}$-$r_2$, $r_{10}$-$r_3$, etc., whereas if there were a misalignment between only the first decile and the second decile the only $r_j$-$r_i$ term that would be positive would be $r_2$-$r_1$. Therefore, for a greater separation in misaligned response rates (i.e a greater breadth of misalignment), the numerator of equation (1) would be greater and therefore B(r) would be greater.

The example depth score calculator module 604 calculates a score that represents an extent to which there is a misalignment in a depth of response rates for a response rate by decile model. As defined in this disclosure, a depth of misalignment of response rates for the response rate by decile model represents an extent of a magnitude of a difference in response rates for a combination of deciles multiplied by an observation weight percentage of one of the deciles in the combination of deciles multiplied by a weighting factor that is proportional to a breadth of misalignment. That is, the depth of misalignment is a function of the degree to which response rates differ between deciles multiplied by an observation weight percentage for one of the deciles, multiplied by a breath of misalignment weighting factor.

In an example implementation, the depth of misalignment of response rates can be represented by the following equation 2:

$$D(r) = \sum_{i<j, r_i>0}^{10} \max\left\{0, W_D(i) * \frac{r_j - r_i}{r_i} * \frac{j-i}{\sum_{r_j - r_i > 0}(j-i)}\right\}$$

where, D(r) is the breath of misalignment of response rates r,
$r_j$ is a measured response rate for the jth decile,
$r_i$ is a measured response rate for the ith decile,
$W_D(i)$ is an observation rate percentage for the ith decile,
i and j are decile indexes,
i ranges from 1 to 9 and
j ranges from 2 to 10.

Each $r_j$-$r_i$ term represents a degree to which a response rate for one decile is greater than a response rate for another decile. The greater the $r_j$-$r_i$ term, the greater the depth of misalignment.

The depth of misalignment is adjusted by the observation rate for the ith decile. For each positive $r_j$-$r_i$ term for an ith decile, the higher the observation rate is for the ith decile, the greater the depth of misalignment is magnified for the ith decile. Thus, misalignment that occurs for a high observation rate (corresponding to a high number of surveys or questionnaires that are sent out for a decile), is given a greater weight when determining the depth of misalignment for a response rate model.

The depth of misalignment is further adjusted by a breadth of misalignment for a decile (as determined by the rightmost term in equation 2). The numerator j-i is proportional to a breadth of misalignment—the higher the separation of deciles in which a misalignment occurs, the greater the breadth of misalignment. The denominator $\Sigma_{rj-ri>0}(j-i)$ is a sum of j-i terms for all misalignments. Therefore, the higher the breadth of misalignment, the greater the depth of misalignment D(r).

Equation 2 is formulated such that only misalignment values contribute to the depth of misalignment D(r). A misalignment value is calculated when an $r_j$-$r_i$ term has a positive value, indicating a misalignment between the ith and jth decile. When response rates for the ith and jth deciles are in alignment, the $r_j$-$r_i$ term has negative value. Therefore, the term to the right of the zero in equation 2 (starting with $W_D(i)$), also has a negative value. However, a summation of terms for D(r) in equation 2 calculates a maximum of either zero or the term to the right of the zero. Therefore, when the term to the right of the zero is a negative value, the terms within brackets { } evaluates to a zero and do not contribute to the depth of misalignment D(r).

The example model ranking index calculator module 606 calculates a score that represents a model ranking index (MRI) performance measure for a response rate by decile model. The higher an MRI score, the better the response rate by decile model is in predicting response rates from individuals and organizations in response to surveys or questionnaires. In addition, the higher the MRI score, the better the model is in grouping individuals and organizations into deciles and the more likely the response rates for the deciles will be in alignment.

In an example implementation, the MRI score can be represented by the following equation 3:

$$MRI = 1 - \min\{B(r) + D(r), 1\}$$

where, B(r) is the breadth of misalignment from equation 1 and D(r) is the depth of misalignment from equation 2.

In the calculation for MRI, a sum is calculated for B(r) and D(r). Then a minimum value is determined from this sum and 1. The use of the minimum value ensures that the bracketed term is never greater than 1 and that MRI is never greater than 1. The higher the score for MRI, the more the response rate by decile model is in alignment. As a general rule of thumb, a MRI score that is greater than equal to 0.9 is considered to indicate an excellent rank order alignment; a MRI score that is greater than equal to 0.8 but less than 0.9 is considered to have a good rank order; and a MRI score that is less than 0.8 is considered to have a questionable rank order, deserving of further investigation. In addition, a relative drop in an MRI score from one month to a next month can indicate deterioration in the performance of the response rate by decile model.

FIG. 7 shows tables 700 that list example response rates and observation weights for two response rate by decile models. The example tables 700 include a decile table 702, a table 704 of response rates (RR) and observation weights for an example response rate by decile model E and a table 706 of response rates (RR) and observation weights for example response rate by decile model F.

As shown in FIG. 7, response rates for model E range from 1.30% for decile 2 to 0.25% for decile 9. Misalignments occur at decile 2, because the response rate of 1.30% for decile 2 is greater than the response rate of 1.00% for decile 1 and at decile 10 because the response rate of 0.60% for decile 10 is greater than the response rate of 0.25% for decile 9. Observation weights range from 15.4% from decile 2 to 3.0% for decile 3.

For response rate by decile model F, response rates range from 1.30% for decile 2 to 0.2% at decile 9. Misalignments occur at decile 2 and at decile 10. Observation weights range from 14.8% at decile 2 to 2.9% at decile 10.

Looking at the response rate and observation data in tables 704 and 706, it can be difficult to determine which model, response rate by decile model E or response rate by decile model F, provides a better alignment of response rates, taking observation rates into account. However, when the response rate and observation data from tables 704 and 706 are used in conjunction with the model ranking index performance measure, the resultant MRI score can provide a numerical indication of which response rate by decile model, model E or model F, has a better alignment of response rates per decile.

Figure 8:
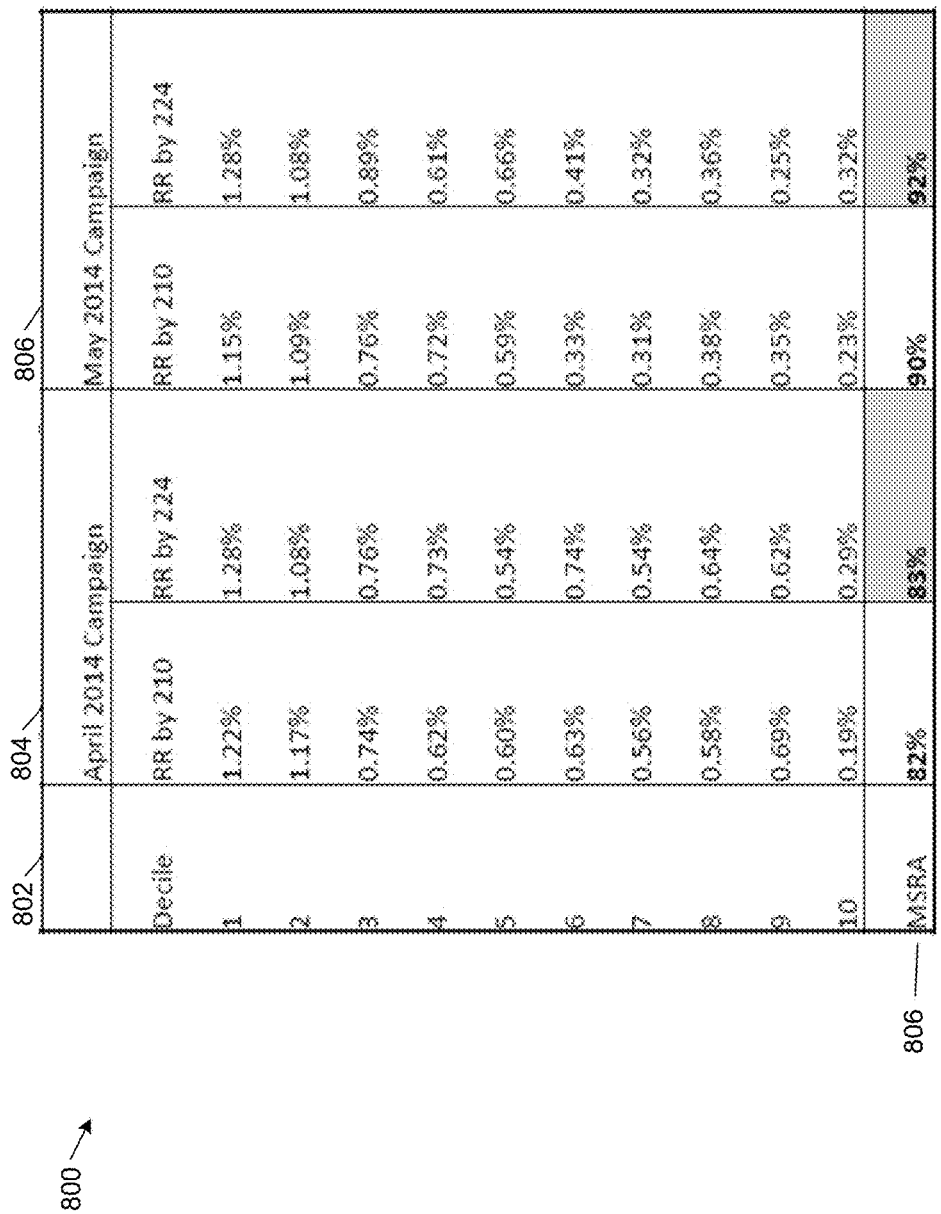
FIG. 8 shows a table that provides a comparison of example two response rates by decile models.

FIG. 8 shows an example table 800 showing a comparison of response rate by decile models 210 and 224 over a two month period. The table 800 includes column 802 showing decile numbers, column 804 showing response rates and MRI scores for an example April 2014 campaign and column 806 showing response rates and MSA scores for a May 2014 campaign.

As shown in column 804, for the April 2014 campaign, example response rates for model 210 range from 1.22% for decile 1 to 0.19% for decile 10 with one misalignment at decile 9. Example response rates for model 224 for the April 2014 campaign range from 1.28% for decile 1 to 0.29% for decile 10 with one misalignment at decile 6. As shown in column 806, for the May 2014 campaign, example response rates for model 210 range from 1.15% for decile 1 to 0.23% for decile 10 with one misalignment at decile 8. Example response rates for model 224 for the May 2014 campaign range from 1.28% for decile 1 to 0.25% for decile 9 with three misalignments, one at decile 5, a second at decile 8 and a third at decile 10.

Although observation weights are not shown in FIG. 8, it can be difficult looking at the response rates for models 210 and 224 to determine which model is more accurate in predicting aligned response rates. However, when using the response rates in conjunction with equations 1-3 above, one can calculate an MRI score for each model for each of the April 2014 and May 2014 campaigns. As shown in column 806, the MRI score for models 210 and 224 for the April 2014 campaign are 82% and 83%, respectively and the MRI score for models 210 and 224 for the May 2014 campaign are 90% and 92%, respectively. Therefore, using the MRI scores one can determine that model 224 has a slightly higher performance than model 210.

The systems and methods of the present disclosure can be used to store response rates and observation rates for different time periods in a spreadsheet, for example an Excel spreadsheet, and produce a graph showing MRI scores for the different time periods. The spreadsheet can include built-in formulas, including equations 1, 2, and 3.

FIG. 9 shows an example spreadsheet 900 that includes example time periods, observations and response rates. The spreadsheet 900 includes columns for time period 902, decile number 904, observations 906 and response rate 908. As shown in spreadsheet 900, example time periods are included for July 2014, September 2014 and May 2015. For each time period, observations 906 and response rates 908 are shown for each decile of the time period. An observation rate can be calculated for each decile by dividing the number of observations for a decile by a sum of observations for all ten deciles for a time period.

The column data for the time periods 902, observations 906 and response rates 908 can be manually entered into the spreadsheet by a user or can be programmed into the spreadsheet from data received and stored on a computing device. For example, column data can be received from one or more of computing devices 102, 104 and stored on server computer 106.

The spreadsheet 900 also includes an example calculate MRI button 910 that can be used to calculate MRI scores from the column data in spreadsheet 900. MRI scores can be generated for each of the time periods 902. The MRI scores can be summarized in column and graph form.

Figure 10:
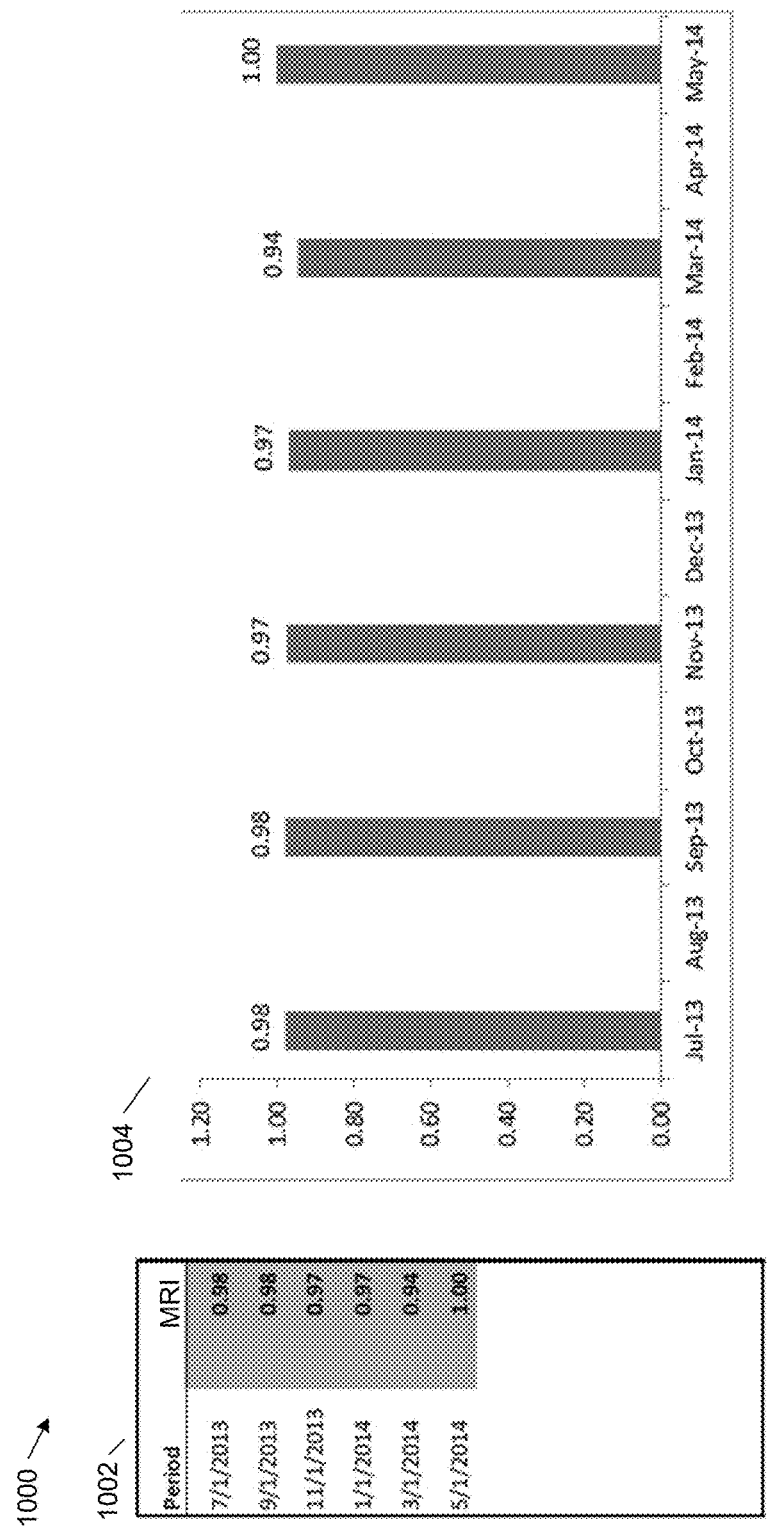
FIG. 10 shows example model alignment scores that can be calculated from data in the spreadsheet of FIG. 9.

FIG. 10 shows example MRI scores 1000 that can be calculated from the column data in spreadsheet 900. The example MRI scores 1000 can be displayed in example table 1002 and in example bar graph 1004.

Figure 11:
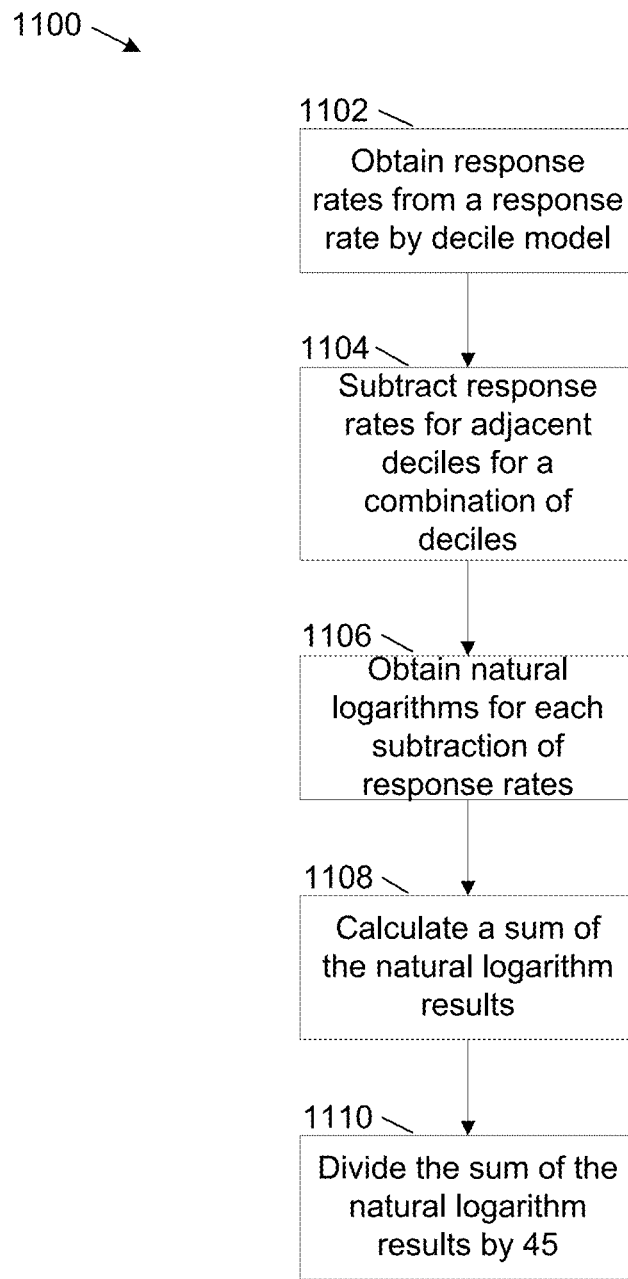
FIG. 11 shows a flowchart of an example method for calculating a breadth of misalignment score for a response rate by decile model.

FIG. 11 shows a flowchart of an example method 1100 for calculating a breadth of misalignment score for a response rate by decile model. The breadth of misalignment score corresponds to a distance in deciles to which response rate data alignment deviations are separated. Method 1100 is an example implementation for breadth of misalignment equation 1, discussed earlier herein and repeated below here.

$$B(r) = \frac{\sum_{i<j}^{10} \ln(r_j - r_i)}{45}$$

At operation 1102, response rates are obtained from a response rate by decile model. The response rate by decile model is a model that organizes customers into 10 groups based on a likelihood that the customers will respond to a survey or questionnaire from an organization. The survey or questionnaire can be in the form of a mailing from the organization or the survey or questionnaire can be sent to the customers electronically. The 10 groups are such that the group of customers most likely to respond to the survey or questionnaire corresponds to group 1, the group of customers next likely to respond corresponds to group 2 and so on with the group of customers least likely to respond corresponding to group 10. In this disclosure, each group is referred to as a decile, even though the number of customers in each group may not be equal.

At operation 1104, response rates for adjacent deciles are subtracted for a combination of deciles for which a decile number i is less than a decile number j. As discussed earlier herein, there are 45 such combinations including $r_2$-$r_1$, $r_3$-$r_1$, $r_4$-$r_1$, $r_5$-$r_1$, $r_6$-$r_1$, $r_7$-$r_1$, $r_8$-$r_1$, $r_9$-$r_4$, $r_{10}$-$r_1$, $r_3$-$r_2$, $r_4$-$r_2$, $r_5$-$r_2$, $r_6$-$r_2$, $r_7$-$r_2$, $r_8$-$r_2$, $r_9$-$r_2$, $r_{10}$-$r_2$, $r_4$-$r_3$, $r_5$-$r_3$, $r_6$-$r_3$, $r_7$-$r_3$, $r_8$-$r_3$, $r_9$-$r_3$, $r_{10}$-$r_3$, $r_5$-$r_4$, $r_6$-$r_4$, $r_7$-$r_4$, $r_8$-$r_4$, $r_9$-$r_4$, $r_{10}$-$r_4$, $r_6$-$r_3$, $r_7$-$r_3$, $r_8$-$r_3$, $r_9$-$r_3$, $r_{10}$-$r_3$, $r_7$-$r_6$, $r_8$-$r_6$, $r_9$-$r_6$, $r_{10}$-$r_6$, $r_8$-$r_7$, $r_9$-$r_7$, $r_{10}$-$r_7$, $r_9$-$r_8$, $r_{10}$-$r_8$ and $r_{10}$-$r_9$.

At operation 1106, natural logarithms are obtained for each of the 45 combinations of subtraction results shown above. When a misalignment occurs between any two of the subtraction results, the subtraction result has a positive value and the natural logarithm result is also a positive value.

At operation 1108, a sum of the natural logarithm results from operation 1106 is calculated. At operation 1110, this sum is divided by 45. The sum of the natural logarithm results divided by 45 corresponds to the breadth of misalignment score B(r).

Figure 12:
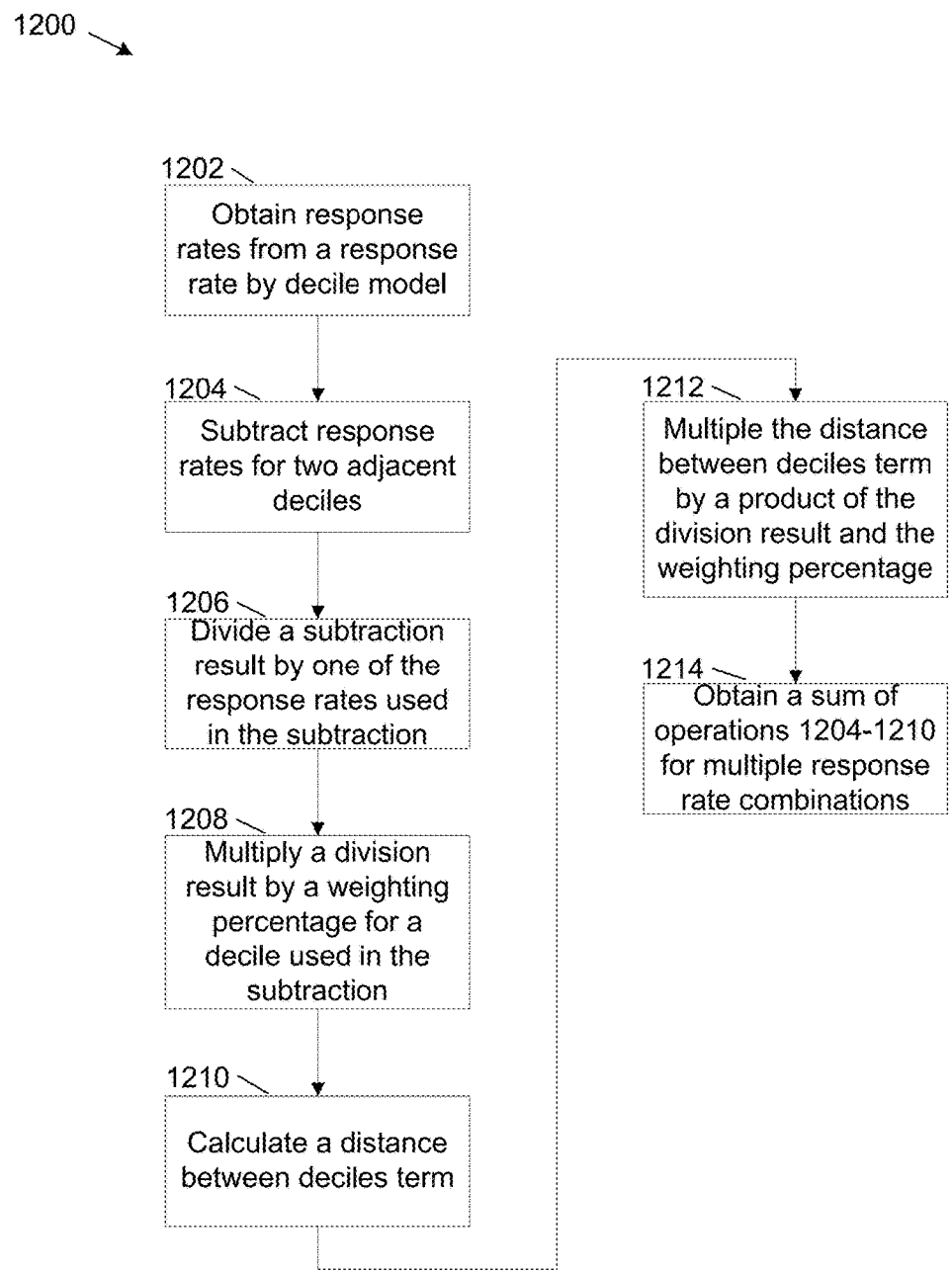
FIG. 12 shows a flowchart of an example method for calculating a depth of misalignment score for a response rate by decile model.

FIG. 12 shows a flowchart of an example method 1200 for calculating a depth of misalignment score for the response rate by decile model. The depth of misalignment score corresponds to a difference in response rates for a combination of deciles multiplied by an observation weight percentage of one of the deciles in the combination of deciles multiplied by a measure of breadth of response rank misalignment. Method 1200 is an example implementation for depth of misalignment equation 2, discussed earlier herein and repeated below here.

$$D(r) = \sum_{i<j, r_i>0}^{10} \max\left\{0, W_D(i) * \frac{r_j - r_i}{r_i} * \frac{j-i}{\sum_{r_j - r_i > 0}(j-i)}\right\}$$

At operation 1202, response rates are obtained from a response rate by decile model, similar to operation 1102.

At operation 1204, response rates for two adjacent deciles for a combination of response rates are subtracted. The combination of response rates corresponds to those for which a decile number i is less than a decile number j, as discussed with regard to operation 1104.

At operation 1206, a subtraction result is divided by one of the response rates used in the subtraction. For example, if the subtraction corresponds to $r_5$-$r_4$, the subtraction result of $r_5$-$r_4$ is divided by $r_4$. As another example, if the subtraction corresponds to $r_9$-$r_6$, the subtraction result of $r_9$-$r_6$ is divided by $r_6$.

At operation 1208, the division result from operation 1206 is multiplied by a weighting percentage for a decile used in the subtraction. The weighting percentage corresponds to an observation rate for the decile. The observation rate represents a number of the questionnaires or surveys sent out for the decile. For example, if the subtraction corresponds to $r_8$-$r_3$, a weighting percentage for decile 3 is used and if the subtraction corresponds to $r_{10}$-$r_5$, a weighting percentage for decile 5 is used. The weighting percentage is obtained from the response rate by decile model.

At operation 1210, a distance between deciles term is calculated. The distance between deciles term is the term in equation 2 above having j-i in the numerator. The larger the separation between deciles for a misalignment, the greater the j-i term will be. The denominator for this term corresponds to a sum of all j-i terms for which $r_j$-$r_i$>0, indicating a misalignment.

At operation 1212, the distance between deciles term at operation 1210 is multiplied by a product of the division result at operation 1208 and the weighting percentage used at operation 1208.

At operation 1214, a sum of a result of operation 1212 for decile i to decile 10 is obtained, where i<j. The sum of the result of operation 1212 for decile i to decile 10 corresponds to the depth of misalignment score D(r).

Figure 13:
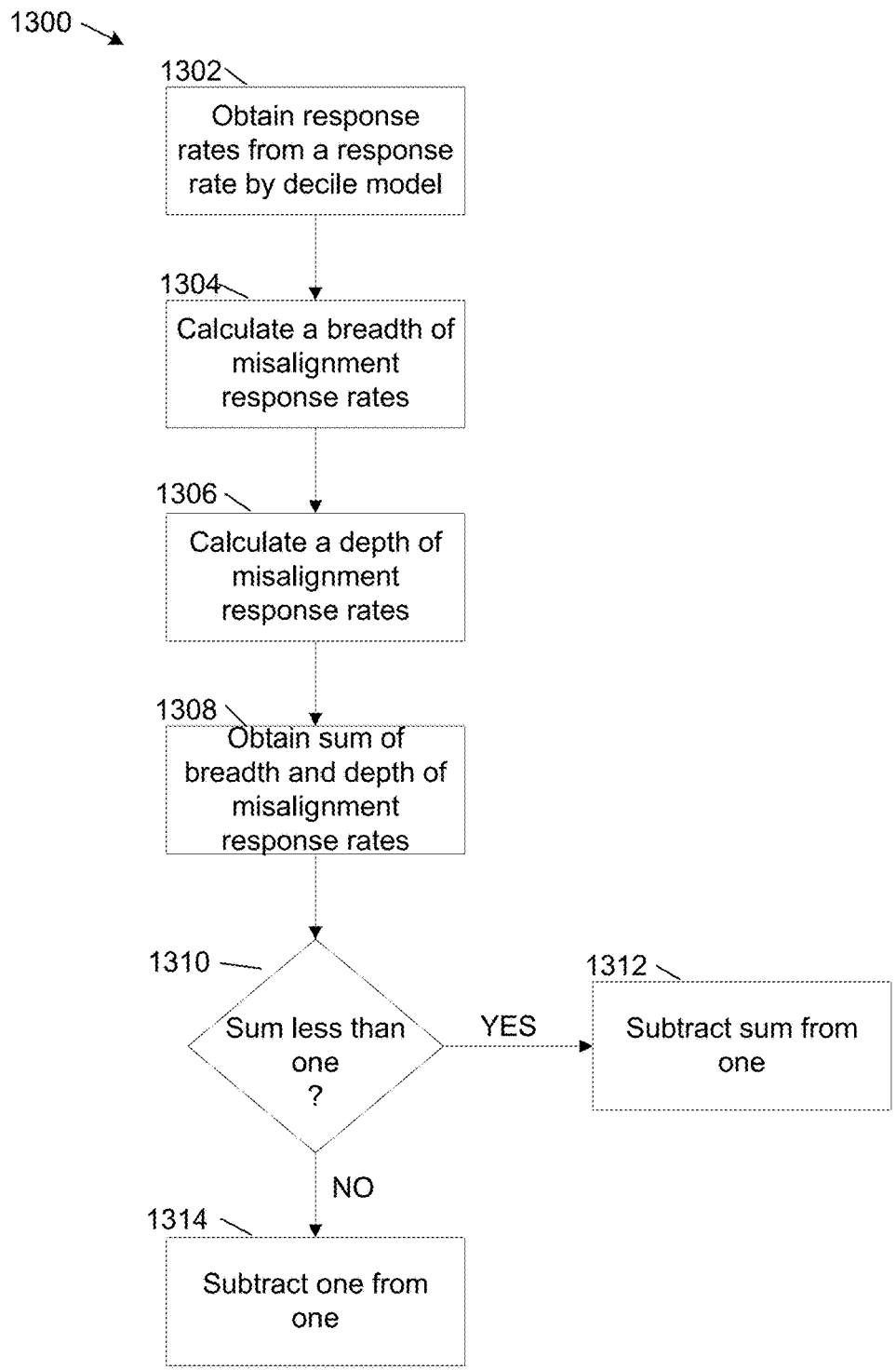
FIG. 13 shows a flowchart of an example method for calculating a model ranking index for a response rate by decile model.

FIG. 13 shows a flowchart of an example method 1300 for calculating a model ranking index for the response rate by decile model. Method 1300 is an example implementation for the model ranking index equation 2, discussed earlier herein and repeated below.

MRI=1−min{B(r)+D(r),1}

At operation 1302, response rates are obtained from a response rate by decile model, similar to for operations 1102 and 1302.

At operation 1304, a breadth of misalignment of response rates are calculated, per method 1100. At operation 1306, a depth of misalignment response rates are calculated, per method 1200.

At operation 1308, a sum of the breadth of misalignment response rates and the depth of misalignment response rates is calculated.

At operation 1310, a determination is made as to whether the sum from operation 1308 is less than one. At operation 1312, when a determination is made that the sum is less than one, the sum is subtracted from one. The sum subtracted from one is equal to the MRI score. At operation 1314, when a determination is made that the sum is greater than or equal to one, then one is subtracted from one and the MRI score has a value of zero.

Figure 14:
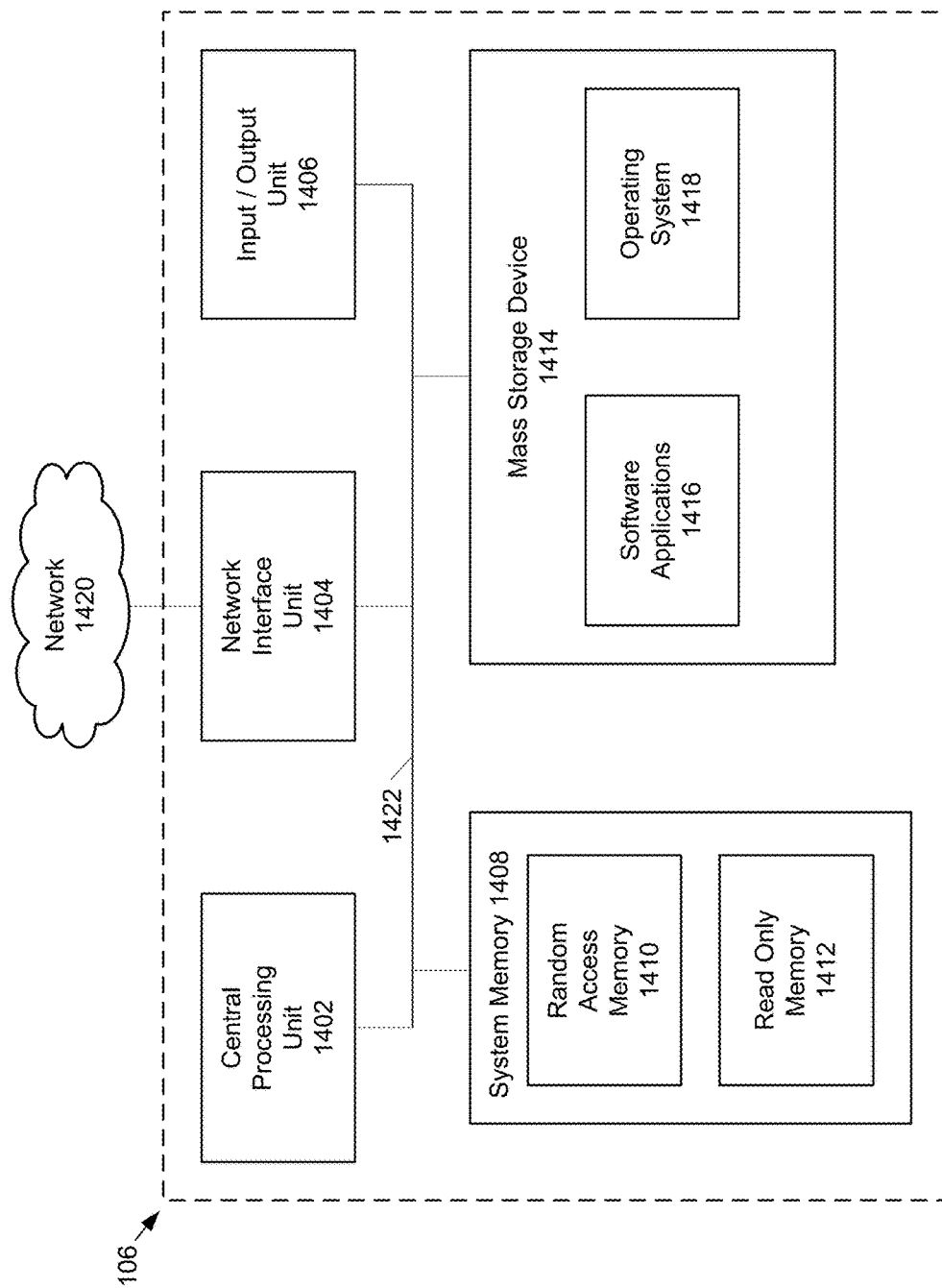
FIG. 14 shows example physical components of the server computer of FIG. 1.

As illustrated in the example of FIG. 14, server computer 106 includes at least one central processing unit ("CPU") 1402, a system memory 1408, and a system bus 1422 that couples the system memory 1408 to the CPU 1402. The system memory 1408 includes a random access memory ("RAM") 1410 and a read-only memory ("ROM") 1412. A basic input/output system that contains the basic routines that help to transfer information between elements within the server computer 106, such as during startup, is stored in the ROM 1412. The server computer 106 further includes a mass storage device 1414. The mass storage device 1414 is able to store software instructions and data. Some or all of the components of the server computer 106 can also be included in computing devices 102 and 104.

The mass storage device 1414 is connected to the CPU 1402 through a mass storage controller (not shown) connected to the system bus 1422. The mass storage device 1414 and its associated computer-readable data storage media provide non-volatile, non-transitory storage for the server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 106.

According to various embodiments of the invention, the server computer 106 may operate in a networked environment using logical connections to remote network devices through the network 1420, such as a wireless network, the Internet, or another type of network. The server computer 106 may connect to the network 1420 through a network interface unit 1404 connected to the system bus 1422. It should be appreciated that the network interface unit 1404 may also be utilized to connect to other types of networks and remote computing systems. The server computer 106 also includes an input/output controller 1406 for receiving and processing input from a number of other devices, including a touch user interface display screen, or another type of input device. Similarly, the input/output controller 1406 may provide output to a touch user interface display screen or other type of output device.

As mentioned briefly above, the mass storage device 1414 and the RAM 1410 of the server computer 106 can store software instructions and data. The software instructions include an operating system 1418 suitable for controlling the operation of the server computer 106. The mass storage device 1414 and/or the RAM 1410 also store software instructions, that when executed by the CPU 1402, cause the server computer 106 to provide the functionality of the server computer 106 discussed in this document. For example, the mass storage device 1414 and/or the RAM 1410 can store software instructions that, when executed by the CPU 1402, cause the server computer 106 to display received data on the display screen of the server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
a processing unit; and
system memory, the system memory including instructions which, when executed by the processing unit, cause the electronic computing device to:
obtain first data from a first response rate by decile model, the first data including response rates for responses received from one or more individuals or organizations in response to communications sent to the one or individuals or organizations, the first data being organized into deciles;
obtain second data from the first response rate by decile model, the second data including a weighting percentage for each of the deciles, wherein the weighting percentage is calculated by taking a number of communications sent out for each of the deciles divided by a total number of communications sent out for all of the deciles;
use the first data and the second data to calculate a first performance score for the first response rate by decile model, the first performance score providing an indication as to how well the response rate data is aligned by decile in the first response rate by decile model, wherein calculation of the first performance score includes:
calculate differences in response rates between the deciles;
use the differences in response rates between the deciles to determine one or more misalignments in the response rates between deciles; and
calculate a numerical value proportional to a distance in deciles to which response rate data alignment deviations are separated; and
apply the first performance score to minimize misalignment and thereby enhance efficiency of sending of the communications by the electronic computing device, wherein enhancing efficiency comprises minimizing the communications sent from the electronic computing device by sending the communications to the one or more individuals or organizations most likely to respond to the communications.

2. The electronic computing device of claim 1, wherein the instructions further cause the computing device to:
obtain third data from a second response rate by decile model, the third data including response rates for responses received from one or more individuals or organizations in response to communications sent to the one or individuals or organizations, the third data being organized into deciles;
obtain fourth data from the second response rate by decile model, the fourth data including a weighting percentage for each of the deciles; and
use the third data and the fourth data to calculate a second performance score for the second response rate by decile model, the second performance score providing an indication as to how well the response rate data is aligned by decile in the second response rate by decile model.

3. The electronic computing device of claim 2, wherein the instructions further cause the electronic computing device to compare first performance score with the second performance score and determine a relative performance of first response rate by decile model compared to the second response rate by decile model.

4. The electronic computing device of claim 1, wherein the first data and the second data comprises data received for a first time period.

5. The electronic computing device of claim 4, wherein the instructions further cause the electronic computing device to:
obtain third data and fourth data for the first response rate by decile model for a second time period, the third data including response rates for responses received from one or more individuals or organizations in response to communications sent to the one or individuals or organizations, the third data being organized into deciles, the fourth data including a weighting percentage for each of the deciles; and use the third data and the fourth data to calculate a second performance score for the first response rate by decile model, the second performance score providing an indication as to how well the response rate data is aligned by decile in the first response rate by decile model for the second time period.

6. The electronic computing device of claim 5, wherein the instructions further cause the electronic computing device to
compare the first performance score with the second performance score;
determine whether the second performance score is less than a predetermined percentage of the first performance score; and
when the second performance score is less than the predetermined percentage of the first performance score, provide an indication that performance has degraded in the first response rate by decile model.

7. The electronic computing device of claim 1, wherein a misalignment occurs when a response rate for a first decile is greater than a response rate for a second decile when the response rate by decile model predicts that the response rate for the first decile should be equal to or less than the response rate for the second decile.

8. The electronic computing device of claim 7, wherein the first performance score decreases for each misalignment that occurs.

9. The electronic computing device of claim 7, wherein the greater the first decile is separated in decile distance from the second decile, the more the first performance score decreases.

10. The electronic computing device of claim 1, wherein calculate a first performance score for the first response rate by decile model includes:
calculate differences in response rates between deciles;
use the differences in response rates between the deciles to determine one or more misalignments in the response rates between deciles; and
calculate a numerical value proportional to a magnitude of a difference in response rates for one of two adjacent deciles in which the one or more misalignments occur.

11. The electronic computing device of claim 10, wherein calculate a first performance score for the first response rate by decile model further includes multiplying the numerical value proportional to the magnitude of the difference in response rates for the one of the two adjacent deciles in which the one or more misalignments occur by a weighting percentage associated with the one of the two adjacent deciles.

12. The electronic computing device of claim 1, wherein the first performance score is negatively proportional to a score corresponding to a sum of a breadth of misalignment and a depth of misalignment.

13. The electronic computing device of claim 1, wherein the first data and the second data is obtained from a spreadsheet stored on or accessible from the electronic computing device.

14. A computer-readable data storage memory comprising instructions that, when executed by a processing unit of an electronic computing device, cause the processing unit to:
obtain first data from a response rate by decile model, the first data including response rates for responses received from one or more individuals or organizations in response to communications sent to the one or more individuals or organizations, the first data being organized into deciles;
obtain second data from the response rate by decile model, the second data including a weighting percentage for each of the deciles, wherein the weighting percentage is calculated by taking a number of communications sent out for each of the deciles divided by a total number of communications sent out for all of the deciles;
use the first data and the second data to calculate a performance score for the response rate by decile model, the first performance score providing an indication as to how well the response rate data is aligned by decile in the response rate by decile model;
wherein calculation of the performance score includes calculation of a breadth of a model rank misalignment, the breadth of the model rank alignment being calculating using the following equation:

$$B(r) = \frac{\sum_{i<j}^{10} \ln(r_j - r_i)}{45}$$

where, B(r) is the breadth of model rank misalignment, i and j are decile indices and $r_j$ and $r_i$ are response rates for deciles j and i, respectively; and apply the first performance score to minimize misalignment and thereby enhance efficiency of sending of the communications by the electronic computing device, wherein enhance efficiency comprises minimizing the communications sent from the electronic computing device by sending the communications to the one or more individuals or organizations most likely to respond to the communications.

15. The computer-readable storage memory of claim 14, wherein calculate a score includes calculating a depth of a model rank misalignment, the calculation of the depth of the model rank misalignment comprising the instructions to further cause the electronic computing device to implement the following equation:

$$D(r) = \sum_{i<j, r_i>0}^{10} \max\left\{0, W_D(i) * \frac{r_j - r_i}{r_i} * \frac{j-i}{\sum_{r_j-r_i>0}(j-i)}\right\}$$

where D(r) is the depth of model rank misalignment, $W_D(i)$ is an observation weight percentage for decile i, and $1 \le i \le 10$.

16. The computer-readable storage memory of claim 15, wherein calculate a score comprises the instructions to cause the electronic computing device to implement the following equation:

$$MRI = 1 - \min\{B(r) + D(r), 1\}$$

where MRI is the score, B(r) is the breadth of model rank misalignment and D(r) is the depth of model rank misalignment.

17. The computer-readable storage memory of claim 14, wherein the first data and the second data is obtained from a spreadsheet stored on or accessible from the electronic computing device.

18. An electronic computing device comprising:
a processing unit; and
system memory, the system memory including instructions which, when executed by the processing unit, cause the first electronic computing device to:
   obtain first data from a first response rate by decile model, the first data including response rates for responses received from one or more individuals or organizations in response to communications sent to the one or individuals or organizations, the first data being organized into deciles;
   obtain second data from the first response rate by decile model, the second data including a weighting percentage for each of the deciles, wherein the weighting percentage is calculated by taking a number of communications sent out for each of the deciles divided by a total number of communications sent out for all of the deciles;
   calculate differences in response rates between deciles;
   use the differences in response rates between the deciles to determine one or more misalignments in the response rates between deciles;
   calculate a numerical value proportional to a distance in deciles to which response rate data alignment deviations are separated;
   calculate a numerical value proportional to a magnitude of a difference in response rates for one of two adjacent deciles in which the one or more misalignments occur;
   calculate a breadth of misalignment score, the breadth of misalignment score being proportional to a sum of a natural logarithm for each of the differences of response rates;
   calculate a depth of misalignment score, the depth of misalignment score being proportional to a sum for each of the differences in response rates between deciles of a product of the weighting percentage for the one of the two adjacent deciles, the numerical value proportional to the magnitude of the difference in response rates for the one of two adjacent deciles in which the one or more misalignments occur and the numerical value proportional to the distance in deciles to which the response rate data alignment deviations are separated;
   calculate a performance score for the response rate by decile model, the performance score being equal to one minus a sum of the breadth of misalignment score and the depth of misalignment score; and
   apply the first performance score to minimize misalignment and thereby enhance efficiency of sending of the communications by the electronic computing device, wherein enhance efficiency comprises minimizing the communications sent from the electronic computing device by sending the communications to the one or more individuals or organizations most likely to respond to the communications.

* * * * *